No. 12,004. Reissued June 24, 1902.

G. AUER.

HOT AIR SIDE WALL REGISTER.

(Application filed May 21, 1902.)

2 Sheets—Sheet 1.

Witnesses

Elmer Seavey

James R. Mansfield

Inventor

George Auer

By Alexander T. Fowell

Attorneys.

No. 12,004. Reissued June 24, 1902.

G. AUER.

HOT AIR SIDE WALL REGISTER.

(Application filed May 21, 1902.)

2 Sheets—Sheet 2.

Witnesses

Elmer Seavey

James R. Mansfield

Inventor

George Auer

By Alexander & Fowell.

Attorneys

UNITED STATES PATENT OFFICE.

GEORGE AUER, OF TOLEDO, OHIO.

HOT-AIR SIDE-WALL REGISTER.

SPECIFICATION forming part of Reissued Letters Patent No. 12,004, dated June 24, 1902.

Original No. 657,049, dated August 28, 1900. Application for reissue filed May 21, 1902. Serial No. 108,440.

*To all whom it may concern:*

Be it known that I, GEORGE AUER, of Toledo, in the county of Lucas and State of Ohio, have invented certain new and useful Improvements in Hot-Air Side-Wall Registers; and I hereby declare that the following is a full, clear, and exact description thereof, reference being had to the accompanying drawings, which form part of this specification.

This invention is an improvement in wall-registers particularly designed for use in connection with ventilating and hot-air heating apparatus; and the main object of the invention is to provide a hot-air wall-register having a swinging adjustable door or damper for the purpose of directing or deflecting all or any portion of the hot-air current into the room in which the register is located or for passing all or any portion of the hot-air current into the room above. The door valve or damper may be used to entirely close the register when not in use.

Another object of the invention is to provide the register with an adjustable valve below the damper or door, which can be used for regulating the flow of air to and through the resister or for entirely shutting off same.

A further object is to provide means for ventilating the room by drawing cold air off the floor and through an opening in the register-casing into side flues or spaces exterior to the hot-air flues, thus in a simple manner affording ventilation and at the same time preventing overheating of the woodwork adjacent to the hot-air flues.

The invention consists in the novel construction of the register and the combinations of parts therein, as hereinafter claimed, and the accompanying drawings illustrate a practical form of hot-air register embodying the invention, and I will describe the latter with reference to said drawings, wherein—

Figure 1:
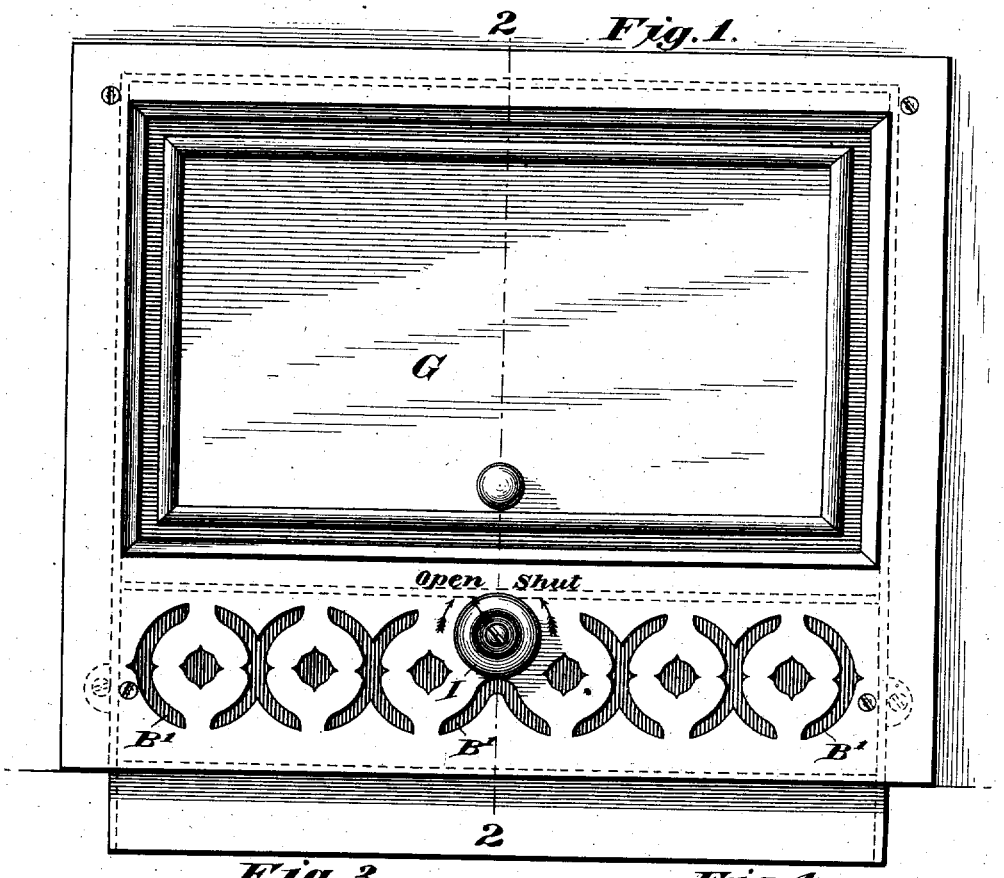
Figure 3:
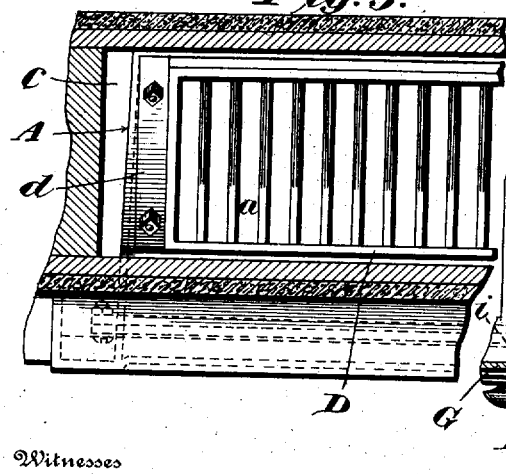
Figure 4:
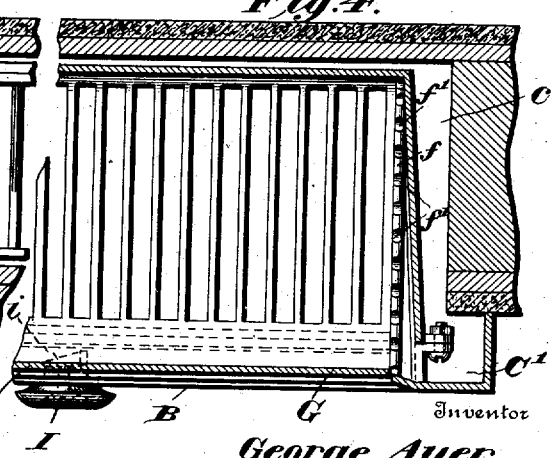
Figure 2:
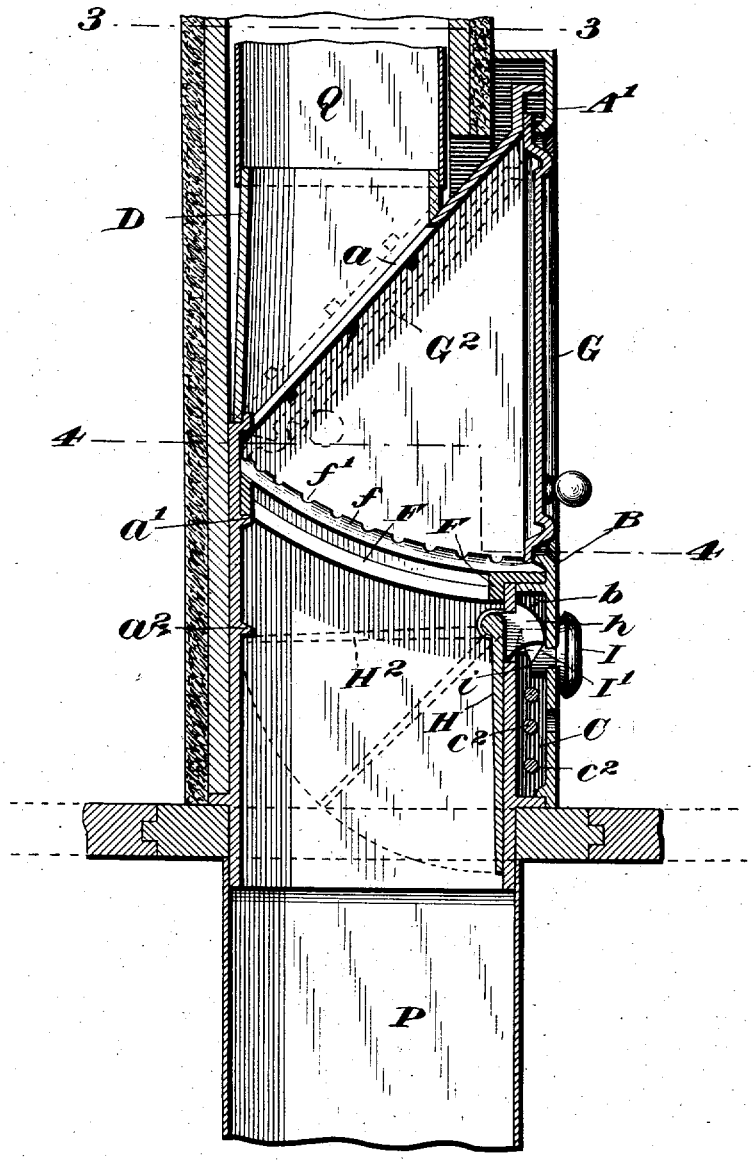

Figure 1 is a front view of a wall-register embodying my invention. Fig. 2 is a vertical section therethrough on line 2 2, Fig. 1. Fig. 3 is a horizontal sectional view on line 3 3, Fig. 2, of one-half the register. Fig. 4 is a similar view on line 4 4, Fig. 2, looking downward, of one-half the register.

Referring to the drawings, A designates the box or casing of the register, which is connected at its lower end to the inlet-flue P and is provided on its front side with a large outlet-opening, around which is fitted the frame-casting B. This frame-casting extends below this outlet-opening of the casing, and between its lower part and the front wall of the casing is a ventilating air-chamber C, hereinafter referred to. The top of casing A slopes downwardly and rearwardly from front to rear, as shown in Fig. 2, and is provided near the rear side with an opening *a*, over which is fitted a flue-section D, which is provided with side flanges *d*, secured by bolts to the top of casing A, section D being connected to a flue Q, which leads to the upper room.

A grating F, which is preferably curved in cross-section, is supported in the casing A, as shown, its rear edge resting upon a ledge *a'* on the back side of the casing, and its front bar F' rests upon the lower edge of the opening in the front wall of the casing and projects over a flange *b*, projecting from the inner face of the frame B above the air-chamber C, as shown. On this grating F are two upstanding flanges *f*, one at each end of the grating, which are provided with a series of notches *f'*, in any one of which the lower end of an adjustable damper or door G may be placed. This door is of a size to close the opening in the front of the casing and in the frame B, as shown, and its upper edge engages in a recess formed between an offset A' of the casing and the upper bar of frame B. This recess allows the door G to be slightly raised, so as to disengage its lower end from the notches *f'*, and then the door may be swung backward or forward into engagement with any of the notches *f'*, the door resting in the notches by gravity and being upheld in any position to which it is adjusted from the closed position (shown in full lines, Fig. 2) to any intermediate position between that and the rearmost position, (shown in dotted lines $G^2$, Fig. 2,) in which the door will entirely close the opening *a*. By this means it is obvious that all or any part of the hot air entering the casing from flue P may be diverted into the room in which the register is located, or all or any part thereof may be passed through the casing directly into flue Q, or part of the air may be directed into the room and part be allowed to escape through the flue Q, according to the adjustment of the door or damper G.

As a further means for regulating the supply of hot air to and above the register or to enable the supply to be entirely cut off, if desired, a valve H is pivoted in the front side of casing A just below the grate F. This valve is provided at its hinged edge with an outwardly-projecting lug *h*, which projects into chamber C, and its end rests against a cam-surface *i* on the end of a rotatable stud I′, which is journaled in a suitable opening in the lower part of the frame B and may be rotated by a knob I. On this knob and on the adjoining surface of the frame may be placed suitable marks to indicate the position of the valve H, so that by turning this knob I the said valve may be thrown either into the open position (shown in full lines, Fig. 2) or to the closed position, (shown in dotted lines $H^2$,) in which position its free edge bears against the ledge $a^2$ on the rear side of the casing, and the supply of hot air is entirely cut off. Obviously valve H may be also adjusted to any intermediate position, so as to regulate the passage of air to and through the register-casing.

In the lower part of frame B is a series of openings B′, communicating with the air-chamber C, and this chamber communicates at its ends with air-spaces C′ at opposite sides of the casing, which in turn communicate with air-spaces *c*, exterior to the side of the casing. These air-spaces *c* may be continued up and around and exterior to the hot-air flue Q, and this construction therefore will afford not only means for ventilating the room near the floor thereof, but the cold air taken in through the chambers C and air flues or spaces C′ and *c* will prevent overheating of any combustible surfaces adjoining the hot-air flues.

The operation of the device will be self-evident from the foregoing description and drawings.

Among the advantages of this construction are that the amount of hot air entering the upper room may be controlled by either the door G or the valve H, or both, and again that when the door G is fully opened, thereby shutting off all air from the flue Q, the amount of air entering the room in which the register is located can be regulated by the valve H, or when door G is closed the amount of air admitted to flue Q can be regulated by valve H. Further, the ventilating-chamber below the hot-air opening I also consider an important advantage in this class of registers.

The register is very simple in construction, and its parts may be cheaply cast and easily assembled, and it also affords a very efficient foot-warmer, which is one of the chief advantages of floor-registers.

What I claim as new is—

1. A side-wall hot-air register comprising a casing having an opening in its front for escape of hot air, an adjustable swinging door adapted to tightly close said opening in one position, and to be swung inward to more or less close the casing and deflect more or less hot air into the room, and a grating extending across the throat of the casing below the door and front opening in casing, said door being adapted to be held in various adjusted positions by contact with the grating, substantially as and for the purpose described.

2. In a side-wall hot-air register, a casing having inlet-opening at bottom and an unobstructed opening in its front side for escape of hot air, and a detachable front frame surrounding the opening in the casing, a swinging door adapted to tightly close said opening in one position, and to be swung inward to more or less close the casing and deflect more or less hot air into the room, the upper edge of the door being confined at the top of the front opening, and a grating extending from the lower edge of said front opening inwardly to the rear side of the casing, substantially as described.

3. A hot-air side-wall register comprising a casing having a hot-air inlet at bottom, and a hot-air-escape opening in its front side, a grating within the casing extending from the lower edge of the front opening to the rear of casing and adapted to prevent articles falling through the casing; and a swinging door having its upper edge confined at the upper edge of the front opening in the casing, and adapted to be swung inwardly over the grating and upheld thereon, substantially as and for the purpose described.

4. In a hot-air side-wall register, a casing having a large hot-air inlet at bottom, a smaller hot-air outlet at top, and a hot-air-escape opening in its front side; a grating within the casing extending from the lower edge of the front opening to the rear of casing adapted to prevent articles falling into the flue, a detachable front frame fitted to the front of casing and surrounding the front opening therein, a swinging door having its upper edge loosely confined at the upper edge of the front opening in the casing and adapted to be swung more or less inwardly over the grating and be upheld thereon, substantially as described.

5. A side-wall hot-air register comprising a casing having an opening in its front for escape of hot air, an adjustable gravitating swinging door adapted to tightly close said opening in one position, and to be swung inward to more or less close the casing and deflect more or less hot air into the room, and a grating extending across the throat of the casing below the door and front opening in casing and by which the door is kept in position within the casing, substantially as described.

6. A hot-air side-wall register comprising a casing having a hot-air inlet at bottom, and a hot-air-escape opening in its front side, a grating within the casing extending from the lower edge of the front opening to the rear of casing and adapted to prevent articles falling through the casing; a swinging door having its upper edge confined at the upper edge of the front opening in the casing and adapted to be swung inwardly over the grating and upheld thereon, a ventilating air-chamber between the lower part of the frame and casing, below the front opening, and air-spaces at the sides of the casing communicating with said ventilating-chamber, substantially as described.

7. The combination of a casing having an opening in its front side, and an adjustable swinging door adapted to close said opening or to be adjusted inwardly so as to direct or deflect more or less air into the room; with the adjustable swinging valve in the casing below said door, and means for adjusting said valve, substantially as described.

8. The combination of a casing having an opening in its front, a grate located in said casing at the lower edge and in rear of said opening, and a door adapted to close said opening or to be adjusted inwardly over and supported by said grate so as to direct or deflect more or less air into the room; with the valve in the casing below said grating, and means for adjusting said valve, substantially as and for the purpose described.

9. The combination of the casing having an opening in its front; with an adjustable door-damper for closing said opening, an upwardly-curved flange fixed within the casing having a series of notches adapted to engage the lower edge of the door and hold the same more or less open when swung inward over the flange, and a regulating-valve below the front opening and means for adjusting said valve.

10. The combination of the casing having an opening in its front, a door for closing said opening, and a grate located within the casing at the lower edge of said opening and extending across the casing, provided with a curved flange having a series of notches adapted to be engaged by the lower end of the door and hold the same more or less open; with a regulating-valve below the grating, and means for adjusting said valve, substantially as and for the purpose set forth.

11. In a hot-air register, the combination of the casing having a sloping top, an opening in said top communicating with a superimposed flue, an opening in the front wall of the casing, a grating extending from the lower edge of said front opening to the rear side of the casing and provided with a notched flange, a frame fitted around the front end of the casing, and an adjustable door having its upper end loosely engaged in a recess between the upper end of the casing and the frame, its lower edge being adapted to engage any of the notches in the flange for the purpose of adjusting the door, substantially as and for the purpose described.

12. In a hot-air register, the combination of the casing having a sloping top, an opening in said top communicating with a superimposed flue, an opening in the front wall of the casing, a grating extending from the lower edge of said front opening inwardly and upwardly to the rear side of the casing and provided with a notched flange, a frame fitted around the front end of the casing, and an adjustable door having its upper end loosely engaged in a recess between the upper end of the casing and the frame, its lower edge being adapted to engage any of the notches in the flange for the purpose of adjusting the door; with a valve in the casing below the grate, and means for operating said valve, and a ventilating air-chamber between the frame and the casing below the front opening in the latter, and air-spaces at the sides of the casing communicating with said ventilating-chamber, all substantially as described.

13. In a hot-air register, the combination of the casing having an opening therein at the front, and an adjustable door-damper for closing said opening; with a grating in the casing having a curved flange provided with a series of notches adapted to be engaged by the lower edge of the door when the latter is swung inward and hold the door more or less open and support the same, substantially as and for the purpose described.

14. In a hot-air register, the combination of the casing having an opening in its front, an adjustable swinging door for closing said opening, and a grating located at the lower edge of said opening and extending across the interior of the casing provided with a curved flange on one end having a series of notches adapted to be engaged by the lower end of the door to support the latter and hold the same more or less open, substantially as described and for the purpose set forth.

15. In a hot-air register, the combination of the casing having an opening in its front, an adjustable inwardly-swinging door-damper for closing said opening, a regulating-valve below the opening, and means for adjusting said valve; said casing being provided with air-spaces at each side and an air-space below the opening therein communicating with the room and with said side air-spaces, for the purpose of ventilating the room, substantially as and for the purpose described.

16. In a hot-air register, the combination of the casing having an opening in its front, an adjustable swinging door for closing said opening, an air-chamber below the opening communicating with the room and with air-spaces at each side of the casing, and a grating located at the lower edge of said opening and extending across the casing, provided with a flange on one end having a series of notches adapted to be engaged by the lower end of the door and support the latter and hold the same more or less open; with the regulating-valve below the grate and means for adjusting said valve, substantially as and for the purpose described.

In testimony that I claim the foregoing as my own I affix my signature in presence of two witnesses.

GEORGE AUER.

In presence of—
B. E. ACHESON,
C. E. TIERNAN.